(No Model.)
H. GASKELL, Jr.
PROCESS OF PURIFYING AMMONIA SODA.
No. 326,423. Patented Sept. 15, 1885.
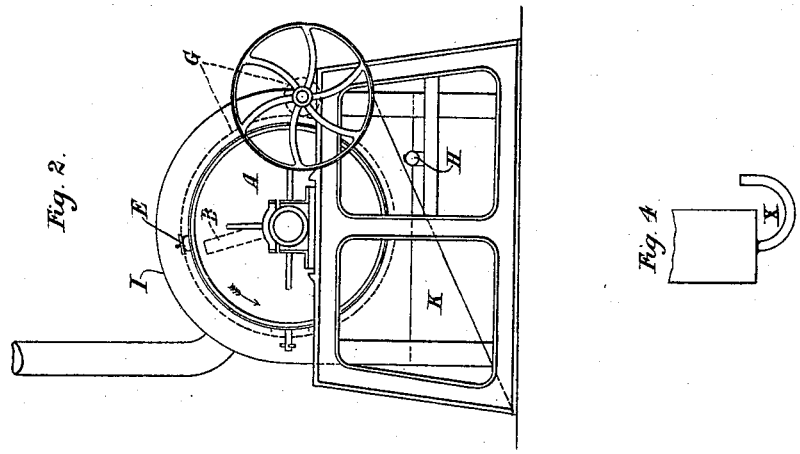
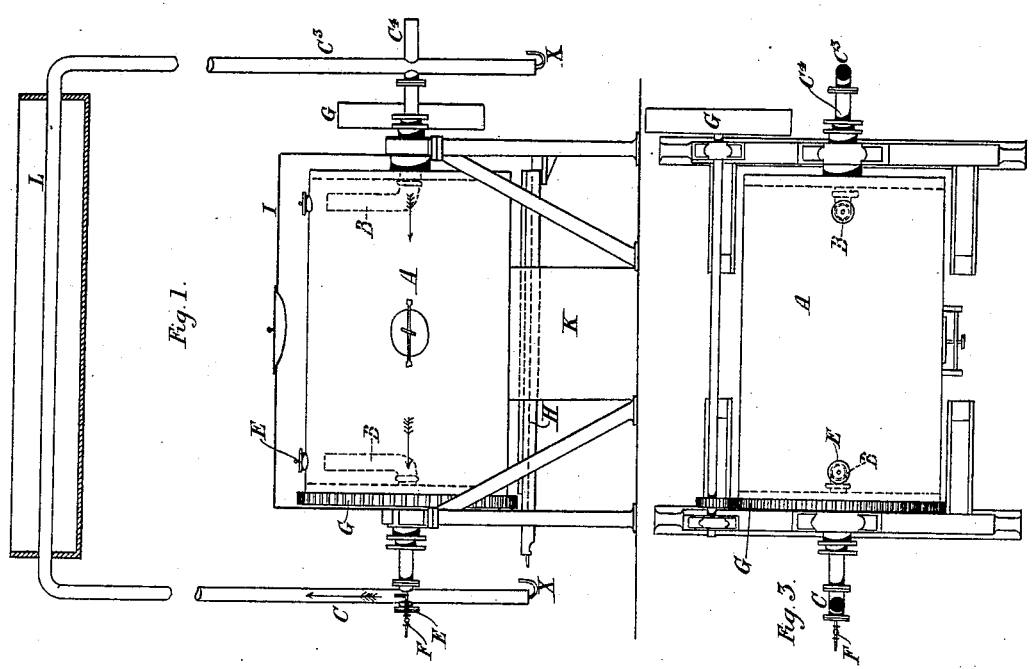

UNITED STATES PATENT OFFICE.

HOLBROOK GASKELL, JR., OF WIDNES, COUNTY OF LANCASTER, ENGLAND.

PROCESS OF PURIFYING AMMONIA SODA.

SPECIFICATION forming part of Letters Patent No. 326,423, dated September 15, 1885.

Application filed July 11, 1885. (No model.) Patented in England August 29, 1884, No. 11,775.

*To all whom it may concern:*

Be it known that I, HOLBROOK GASKELL, the younger, chemical manufacturer, a subject of the Queen of Great Britain and Ireland, and residing at Widnes, in the county of Lancaster, England, have invented certain Improvements in the Purification of Bicarbonate of Soda, (for which I have made application for patent in Great Britain, No. 11,775, dated 29th of August, 1884,) of which the following is a specification.

My invention relates to the purification of bicarbonate of soda made by what is known as the "ammonia-soda process." In this process ammonia and carbonic acid are caused to react upon sodium salts in solution in such a way as to precipitate bicarbonate of soda. This precipitated bicarbonate of soda is contaminated with ammonia.

The object of my invention is to expel by volatilization the ammonia contained in the precipitated bicarbonate of soda without decomposition of the bicarbonate of soda. This I find can be done by maintaining the mixture of bicarbonate of soda and ammonia at a temperature at or above that at which bicarbonate of ammonia is volatilized. This temperature varies with the pressure; but at ordinary atmospheric pressure a temperature not exceeding from 200° Fahrenheit to 250° Fahrenheit will suffice. At this temperature, however, bicarbonate of soda decomposes, giving off carbonic acid, unless an atmosphere of carbonic acid is maintained in the apparatus.

In carrying out my invention various methods of heating the bicarbonate may be employed. Carbonic-acid gas may be heated and the hot gas be passed over or through the bicarbonate of soda until all, or nearly all, the ammonia is volatilized, and the gas be afterward deprived of the ammonia by condensation or absorption; and if the carbonic-acid gas be limited in supply the same gas may be caused to circulate continuously between the apparatus for heating the carbonic acid, the apparatus containing the bicarbonate of soda, and a condenser or absorber; but the method which I prefer is to heat the bicarbonate of soda directly, either by steam in a jacketed vessel or by fire applied to the outside of the vessel. I agitate in any convenient manner by mechanical means the bicarbonate of soda while heating it; but if the vessel containing the bicarbonate of soda be heated by direct fire I prefer to cause the vessel containing it to revolve, so as to prevent overheating of any part of the bicarbonate. The ammonia is volatilized and carried off by the carbonic acid, and may be condensed by cooling or by absorbing it in water or other liquid, as is well understood.

I do not limit myself to any particular apparatus for treating such bicarbonate of soda according to my invention; but I find it advantageous to use such an apparatus as is illustrated in side elevation, end view, and plan, respectively, in Figs. 1, 2, and 3 of the accompanying drawings.

The iron cylinder A is capable of being rotated upon a horizontal axis, and is provided with hollow trunnions or axes capable of turning in bearings or carried by a suitable frame-work. The hollow axis at one end of the cylinder is used for admitting carbonic-acid gas, and that at the other end is used for permitting the exit of carbonic-acid gas, ammonia, and moisture. The hollow axles are continued into the exterior of the cylinder and deflected upward, as shown at B in Fig. 1, for the purpose of avoiding the lodgment therein of solid material and the consequent stoppage of the free passage of the gas into or from the cylinder.

I find it advisable to have apertures, as at E E, in the cylinder A and exit-pipe C, respectively, which apertures can be closed airtight in any convenient manner, and through which, when necessary, the part of the exit-pipe C which is inside the cylinder A may be cleaned easily and freed from dust, which is sometimes deposited there. Outside the cylinder A the exit-pipe C is carried upward to a suitable height, where it passes through a trough, L, containing cold water, and is then returned downward and connected by the branch $C^3$ with the pipe $C^4$, by which the carbonic acid enters at the other end of the cylinder A. I find that when the pipe C is carried upward about thirty feet, the difference of temperature, and consequently the difference of specific gravity, between the gas in the upcast and that in the downcast of the pipe C³ is such that a circulation of gas can be commenced and maintained when desired through the pipe C, whereby the ammonia and moisture which escape from the bicarbonate of soda during the process are conveyed away from the cylinder A and are condensed in the pipes, and may be collected and run off through a lute, X, the carbonic-acid gas returning to the cylinder by the branch C³.

Fig. 4 shows a lute, X, drawn to a larger scale. If at any time this circulation does not commence when desired, the tap of a small steam-jet, F, is opened for a few moments, so that steam plays upward in the upcast branch of the pipe C. By this means circulation is at once set up in the pipe C, and when commenced continues as long as is required.

The charge of impure bicarbonate of soda is introduced into the cylinder A through a man-hole, which is then closed, and the cylinder is made to revolve slowly, for example, through the intervention of a pulley and spur-gearing, G, driven by any suitable motor. I find from two to six revolutions per minute are sufficient. Carbonic-acid gas is turned on or admitted into the interior of the cylinder A by the pipe C⁴. The cylinder is then heated by means of the gas-burner shown at H. To prevent the rapid loss of heat, the cylinder is inclosed in a casing, I. The temperature of the bicarbonate of soda rises, and the ammonia and moisture are rapidly volatilized. The circulation of the gas is then commenced by means of the steam-jet F, which is only used for a few minutes. The circulation of the gas, once commenced, continues until the operation is complete. In due time the bicarbonate of soda will be completely free from ammonia and perfectly dry, and, after discharging it by means of the movable discharge-plate K, is ready for immediate grinding and dressing. The amount of carbonic acid needed for this operation is very small—only so much as is required to fill the cylinder and the pipes. The ammonia and moisture carried forward by the carbonic acid are condensed and leave the pipes by the lutes X as a solution of bicarbonate of ammonia.

In the ammonia-soda process it is customary to roast the ammoniacal bicarbonate of soda, so as to drive off the ammonia, and by decomposing the bicarbonate to liberate the extra equivalent of carbonic acid, and hence the roasting apparatus is filled with carbonic acid; but this operation is essentially different from this invention, the object of which is to prevent the decomposition of the bicarbonate. In the ordinary roasting the carbonic acid in the roasting apparatus has no practical effect in preventing the decomposition of the bicarbonate, for its constant pressure in the apparatus is only maintained by a continuous decomposition of new quantities of bicarbonate, the carbonic acid evolved being removed as fast as liberated and not returned to the roasting apparatus, nor its place supplied from an exterior source.

I claim—

1. The purification of bicarbonate of soda contaminated with ammonia by volatilizing the ammonia in an atmosphere of carbonic acid, substantially as hereinbefore described.

2. The improvement in purifying bicarbonate of soda contaminated with ammonia, consisting in agitating and heating the same in an atmosphere of carbonic acid, so as to volatilize the ammonia without decomposing the bicarbonate, withdrawing the gases, condensing therefrom the ammonia, and returning the carbonic acid to the vessel containing the bicarbonate under treatment, substantially as described.

In testimony whereof I have signed my name to this specification in the presence of two subscribing witnesses.

HOLBROOK GASKELL, JR.

Witnesses:
RICHARD MERCER,
JOHN FARRANT,
*Both of Widnes.*